US012548552B2

(12) United States Patent
Agrawal et al.

(10) Patent No.: US 12,548,552 B2
(45) Date of Patent: Feb. 10, 2026

(54) DYNAMIC LANGUAGE SELECTION OF AN AI VOICE ASSISTANCE SYSTEM

(71) Applicant: International Business Machines Corporation, Armonk, NY (US)

(72) Inventors: Tushar Agrawal, West Fargo, ND (US); Jeremy R. Fox, Georgetown, TX (US); Erez Lev Meir Bilgory, Kiryat Tivon (IL); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 392 days.

(21) Appl. No.: 17/530,640

(22) Filed: Nov. 19, 2021

(65) Prior Publication Data

US 2023/0162721 A1    May 25, 2023

(51) Int. Cl.
*G10L 13/08*    (2013.01)
*G10L 15/00*    (2013.01)
*G10L 15/22*    (2006.01)

(52) U.S. Cl.
CPC .......... *G10L 13/086* (2013.01); *G10L 15/005* (2013.01); *G10L 15/22* (2013.01); *G10L 2015/223* (2013.01)

(58) Field of Classification Search
CPC ..... G10L 13/086; G10L 15/005; G10L 15/22; G10L 2015/223
See application file for complete search history.

(56) References Cited

U.S. PATENT DOCUMENTS

| 2005/0060158 | A1 | 3/2005 | Endo | |
|---|---|---|---|---|
| 2012/0265528 | A1 | 10/2012 | Gruber | |
| 2014/0035823 | A1* | 2/2014 | Khoe | G06F 3/04886 345/171 |

(Continued)

OTHER PUBLICATIONS

"Global Voice Assistant Market is Set to Reach USD 5,843.8 million by 2024, Observing a CAGR of 27.7% during 2019-2024: VynZ Research", Jan. 28, 2020 12:38 ET | Source: VynZ Research , GlobeNewswire by notified, 8 pps., <https://www.globenewswire.com/news-release/2020/01/28/1976318/0/en/Global-Voice-Assistant-Market-is-Set-to-Reach-USD-5-843-8-million-by-2024-Observing-a-CAGR-of-27-7-during-2019-2024-VynZ-Research.html>.

"Language and Conversation-Enabling the next generation of conversational systems", IBM, downloaded from the Internet on Nov. 12, 2021, 3 pps., <https://www.research.ibm.com/haifa/dept/services/lang_conv.shtml>.

"Language and Retrieval", IBM, downloaded from the Internet on Nov. 12, 2021, 2 pps., <https://www.research.bm.com/haifa/dept/imt/ir.shtml>.

"Watson Assistant: Intelligent virtual agent ", IBM, 12 pps., downloaded from the Internet on Nov. 12, 2021, <https://www.ibm.com/cloud/watson-assistant>.

(Continued)

*Primary Examiner* — Paras D Shah
*Assistant Examiner* — Edward Tracy, Jr.
(74) *Attorney, Agent, or Firm* — David K. Mattheis

(57) ABSTRACT

The computer-implemented method provides for a digital virtual assistant (DVA) receiving input spoken in a first language by a user. The DVA determines a context of a current situation based on language and identity of individuals within a proximity of the DVA. The DVA determines whether the context of the current situation includes providing a response using a second language. In response to determining the context of the current situation calls for providing the response in the second language, the DVA determines the second language based on the context, and the DVA responds to the input spoken in the first language by the user, such that the response includes a dynamic selection of the second language and is based on an interaction context of the user and the DVA, and reference to a corpus of interaction context usage of the second language in a historically similar situation.

20 Claims, 3 Drawing Sheets

(56) References Cited

U.S. PATENT DOCUMENTS

| | | | | |
|---|---|---|---|---|
| 2015/0012260 A1* | 1/2015 | Chakladar | ............. | G06F 40/263 |
| | | | | 704/9 |
| 2017/0092278 A1* | 3/2017 | Evermann | ............... | G10L 17/24 |
| 2018/0314689 A1 | 11/2018 | Wang | | |
| 2020/0194000 A1* | 6/2020 | Xian | ...................... | G10L 15/26 |
| 2020/0219492 A1 | 7/2020 | Apsingekar | | |
| 2020/0233683 A1 | 7/2020 | Restrepo Conde | | |
| 2020/0294499 A1 | 9/2020 | Deluca | | |
| 2020/0310742 A1 | 10/2020 | Cohen | | |
| 2020/0320984 A1 | 10/2020 | Kuczmarski | | |
| 2023/0084294 A1* | 3/2023 | Yuan | ...................... | G09B 19/06 |
| | | | | 704/258 |
| 2023/0115321 A1* | 4/2023 | Vu | ......................... | G06N 3/084 |
| | | | | 704/232 |
| 2024/0144562 A1* | 5/2024 | Akmal | .................. | G10L 15/005 |
| 2024/0146776 A1* | 5/2024 | Hansen | .................. | G10L 15/22 |

OTHER PUBLICATIONS

Anonymous, "Language Transposer for Cognitive Assistants," IP.com No. IPCOM000259227D, IP.com Electronic Publication Date: Jul. 22, 2019, 3 pps.

Anonymous, "Matching language and accent in virtual assistant responses," IP.com No. IPCOM000254265D, IP.com Electronic Publication Date: Jun. 14, 2018, 5 pps.

Anonymous, "Method and System for Detecting Regional Language Differences to Enhance Voice Enabled Assistants." IP.com No. IPCOM000257541D, IP.com Electronic Publication Date: Feb. 18, 2019, 5 pps.

* cited by examiner

DYNAMIC LANGUAGE SELECTION OF AN AI VOICE ASSISTANCE SYSTEM

BACKGROUND

The present invention relates to artificial intelligence (AI), and more specifically to a contextual selection of language change by an AI voice-activated digital assistant system.

Artificial intelligence (AI) systems are applied to mobile devices, vehicles, smart devices, as well as devices designed for the home and office environments in the form of voice-activated virtual assistants, such as Amazon's Alexa, Google's "Google Assistant", and Apple's Ski, for example (Alexa is a trademark of Amazon.com, Inc.; Google Assistant is a trademark of Google LLC; Siri is a trademark of Apple Inc., in the U.S. and other countries worldwide). Digital virtual assistants (DVAs) receive input in the form of questions or commands and can determine the meaning of the question or command and respond accordingly.

In some instances, DVAs can be trained or configured to recognize and distinguish the voices of different users. Additionally, DVAs have been enabled to receive voice input and provide voice response in a language selected from a plurality of languages.

SUMMARY

According to an embodiment of the present invention, a computer-implemented method, a computer program product, and a system for dynamic language selection by a virtual digital assistant. The computer-implemented method provides for a digital virtual assistant receiving input spoken in a first language by a first user. The digital virtual assistant determines a context of a current situation based on language and identity of individuals within a proximity of the digital virtual assistant. The digital virtual assistant determines whether the context of the current situation includes providing a response using a second language. In response to determining the context of the current situation calls for providing the response in the second language, the digital virtual assistant determines the second language based on the context, and the digital virtual assistant responds to the input spoken in the first language by the first user, such that the response includes a dynamic selection of the second language and is based, at least in part, on a contextual usage of the at least second language in a historically similar situation.

DETAILED DESCRIPTION

Figure 1:
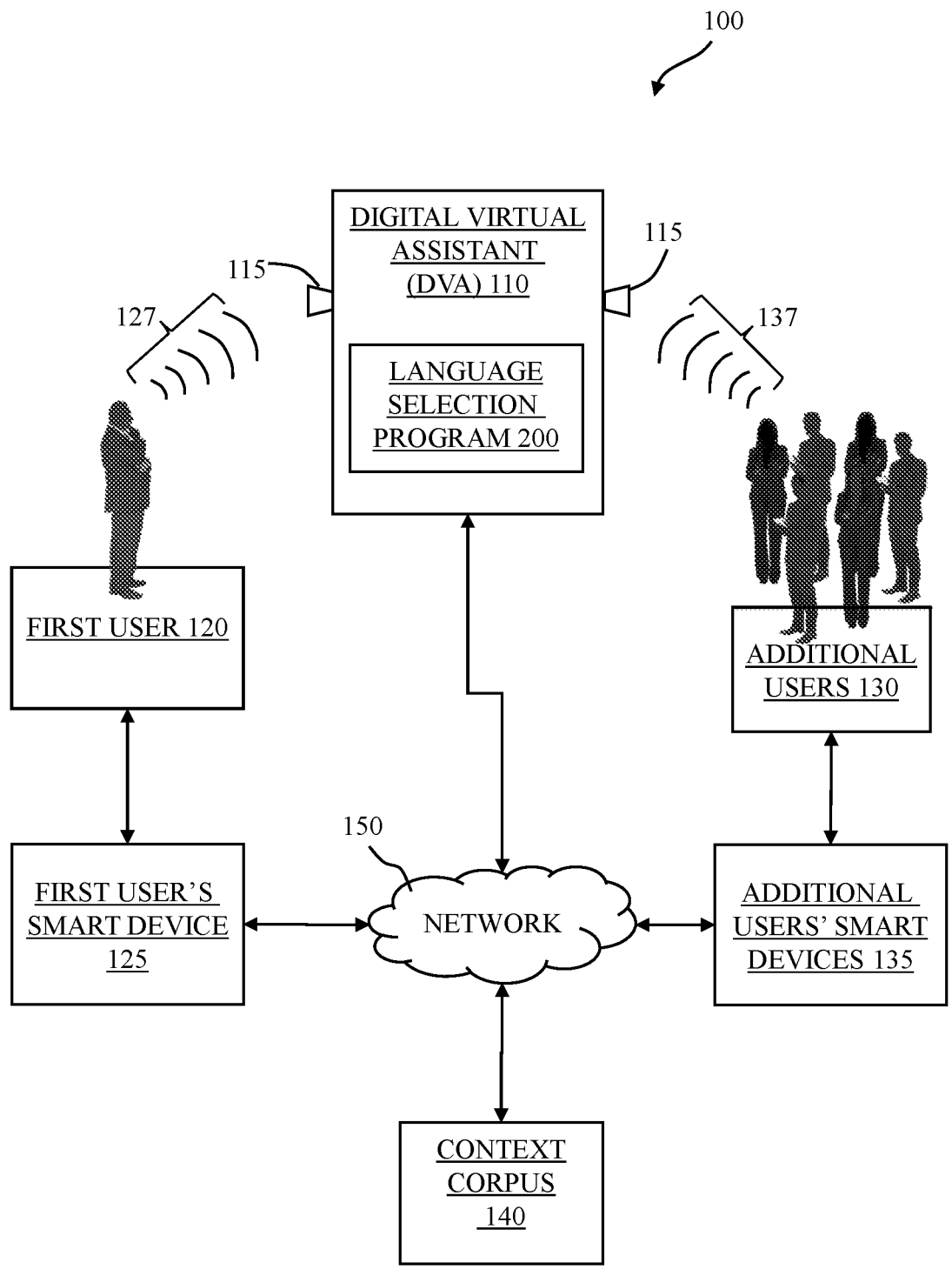
FIG. 1 is a functional block diagram illustrating a distributed data processing environment, in accordance with an embodiment of the present invention.

Embodiments of the present invention recognize that AI-enabled voice assistants, also referred to, herein, as digital virtual assistants (DVAs) receive spoken voice input and provide a reply to the input using an artificially generated voice. The input can be in the form of a question or a command, and the DVA provides a response in the same language as the language of the input received. Some DVAs can perform and determine the meaning of the receipt of input, however, configuration settings enable a selection of one language for input and response at a time.

Embodiments of the present invention recognize that situations exist in which a user interacts with a DVA and the context of the situation calls for a change in language, repetition of the input in a second language, and/or a response in a second language. In some embodiments, the context of the situation may support repetition of the input and response in multiple languages.

In some embodiments, the context of a situation may be determined by the detection of languages spoken in the vicinity of the DVA. For example, the DVA may detect multiple voices speaking in a common language and determine the presence of a guest user known to be unfamiliar with the common language being spoken. The DVA determines the context of the situation and after receiving a command or question in the common language, provides a response to the command in the common language and in a second language known to the guest user.

In some embodiments, the context of a situation includes recognizing an audible response to a spoken question or command remains private and excludes certain or all users within an audibly detectable distance from the DVA. The situation context of excluding users from a response may be for reasons such as protecting a planned surprise event, protecting children from adult conversation content, avoidance of known controversial or conflict-inducing subject matter, and enabling a device owner to perform activity via the DVA without comprehension from guest users located within audibly detectable distance of the DVA.

Embodiments of the present invention provide a computer-implemented method, computer program product, and computer system for a digital virtual assistant to provide a response to a command in a second language, based on the context of an interaction with a user and receiving the command from the user in a first language.

The computer-implemented method provides for a digital virtual assistant (DVA) receiving input spoken in a first language by a first user. The digital virtual assistant determines a context of a current situation based on the language detected and the identity of individuals within proximity of the digital virtual assistant. The digital virtual assistant determines whether the context of the current situation includes providing a response using a second language. In response to determining the context of the current situation calls for providing the response in the second language, the digital virtual assistant determines the second language based on the context, and the digital virtual assistant responds to the input spoken in the first language by the first user, such that the response includes a dynamic selection of the second language based, at least in part, on a contextual usage of the second language in a historically similar situation.

The present invention will now be described with reference to the Figures. FIG. 1 depicts a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

FIG. 1 includes digital virtual assistant (DVA) 110, first user 120, additional users 130, additional users' smart devices 135, context corpus 140, and network 150. DVA 110 and context corpus 140 are interconnected via network 150, and first user 120 and additional users 130 may possess mobile and/or wearable smart devices, respectively, represented by first user smart device 125 and additional users' smart devices 135.

In embodiments of the present invention, DVA 110 provides an interactive audible exchange with first user 120 and receives input from first user 120 in the form of questions, statements, or commands. For brevity and simplicity, the input received from first user 120 by DVA 110 will be referred to, hereafter without limitation, as "commands." DVA 110 receives commands as input from first user 120 in a first language. DVA 110 includes microphone(s) 115 and language selection program 200, depicted as operating from DVA 110. In some embodiments, DVA 110 connects to the Internet and World Wide Web via network 150 and can access available online information as a response to commands received from first user 120. In some embodiments, DVA 110 interacts with Internet of Things (IoT) enabled devices, receives information from some or all of the IoT devices and may perform a degree of operational control on some or all of the IoT devices.

Figure 3:
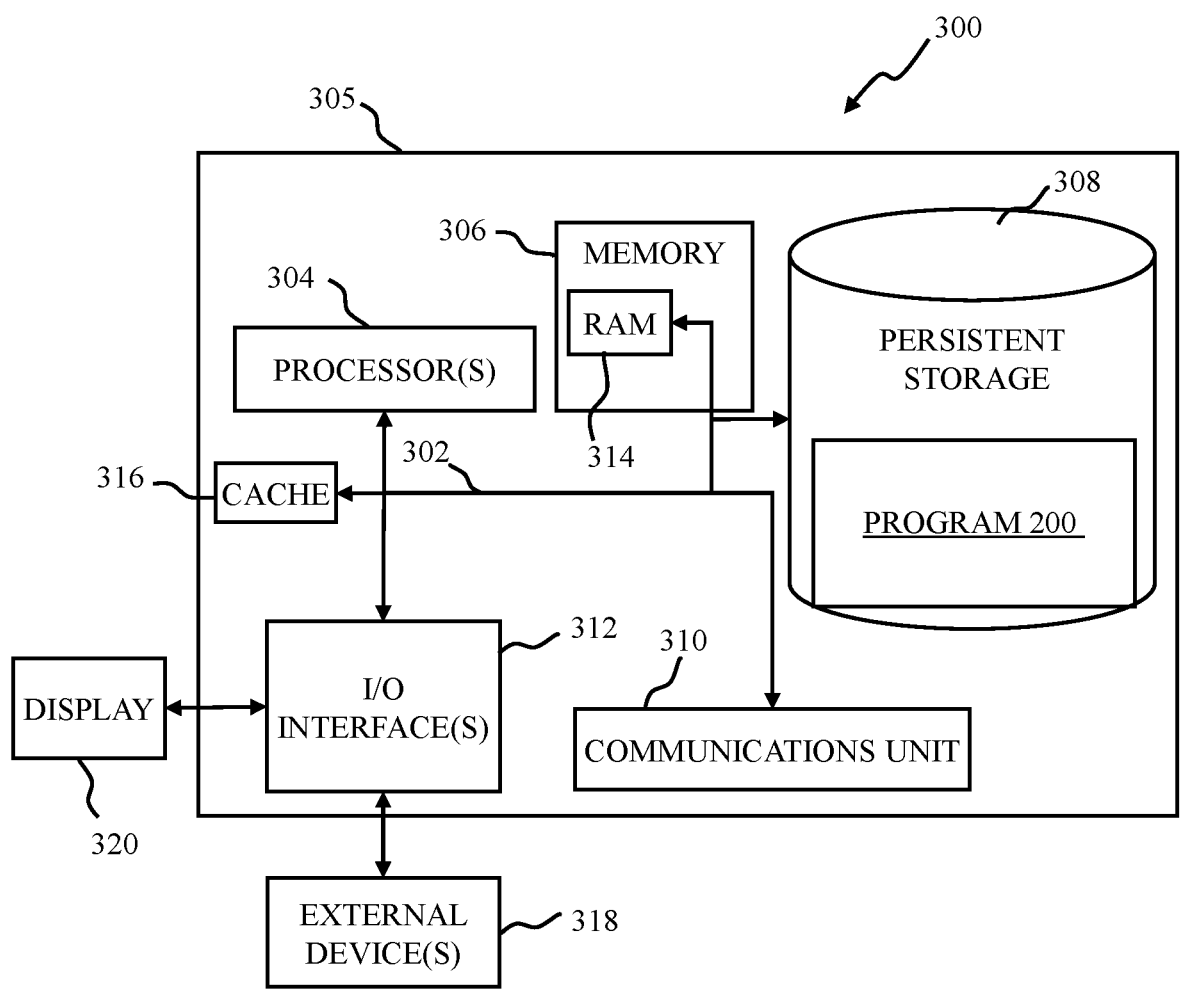
FIG. 3 depicts a block diagram of components of a computing system, including a computing device configured with the capability to operationally perform the language selection program of FIG. 2, in accordance with an embodiment of the present invention.

In embodiments of the present invention, DVA 110 performs as a smart device and includes components similar to those of a server, a laptop computer, a desktop computer, a smartphone, a tablet computer, or another electronic device or computing system capable of receiving, sending, and processing data, and may include internal and external hardware components, depicted in more detail in FIG. 3. In some embodiments, DVA 110 may interact with applications and services hosted and operating in a cloud computing environment. DVA 110 includes operational access to language selection program 200. In some embodiments, language selection program 200 operates from DVA 110 (depicted in FIG. 1), whereas in other embodiments, language selection program 200 operates remotely as communicatively connected to DVA 110 (not shown).

Microphone(s) 115 receive audible input as a component of DVA 110, such as spoken commands from first user 120 and spoken language(s) of additional users 130. Microphone(s) 115 are configured to detect and receive audible input from sources within a communicative distance of DVA 110, enabling language selection program 200 to detect language spoken and commands input within the communicative distance or proximity, which includes a dependency on the range and efficiency of microphone(s) 115 and voice detection and differentiation of DVA 110.

Language selection program 200 operates in conjunction with DVA 110 and context corpus 140. In some embodiments, DVA 110 hosts language selection program 200, whereas in other embodiments, language selection program 200 resides external to DVA 110 and communicates with DVA 110 via network 150 (not shown). Language selection program 200 correlates information received and tracked by DVA 110 and generates a context associated with various instances of situations in which first user 120 interacts with DVA 110, providing commands in a certain language and receiving responses in the same language, different language, or repeated in multiple languages, based on the context of the interaction situation. Language selection program 200 forms associations of the language used by first user 120 to deliver commands to DVA 110 and includes information associated with additional users detected by DVA 110, the languages spoken by the additional users, smart devices of the additional users detected, and information associated with other conditions and attributes of the interaction instance, such as the date, the time, the day of the week, the type of command, the topic of the command, and the historic reference of the command.

Language selection program 200 correlates the collected information for respective instances of first user 120 and DVA 110 interaction and generates a situational context associated with respective interaction instances. Context corpus 140 includes the historic correlations associated with one or more languages as a context associated with a type of interaction situation. In some embodiments, language selection program 200 references context corpus 140 to select a language for a response to a command or a language to use for repeating a command, based on the situational context of an interaction between first user 120 and DVA 110. Embodiments of the present invention determine a context of an interaction situation from the correlation of gathered information associated with the interaction between first user 120 and the DVA 110 and language used for submitting commands, as well as the languages detected from additional users 130 within a communicative distance from DVA 110. In some embodiments, determination of a context of an interaction between first user 120 and DVA 110 includes accessing information from additional users' smart devices 135 for users opting-in to information access from the respective devices.

First user 120 is a human user assuming a role as a source of audible commands directed to DVA 110. In embodiments of the present invention, first user 120 has the capability of delivering spoken commands, represented in FIG. 1 by verbal commands 127, to DVA 110 in at least two distinct languages. First user 120 also has the capability to understand responses provided by DVA 110 in the same at least two distinct languages. In some embodiments, first user 120 may deliver a command to DVA 110 in a first language in a particular situational context and receive a response to the command from DVA 110 in a second language, as determined by language selection program 200 with respect to the determined situational context. In some embodiments, first user 120 delivers a command to DVA 110 in a first language and DVA 110 repeats the command in a second language for the benefit of additional users 130 that are present within a communicative distance of DVA 110 and understand the second language to a greater extent than the first language of the delivered command.

First user's smart device 125 includes identification of first user 120 and includes information associated with the identification of user contacts as well as scheduled activities of first user 120. In some embodiments, first user 120 delivers commands to first user's smart device 125, which transmits the commands to DVA 110 and language selection program 200 via network 150.

Additional users 130 represent one or more users, other than first user 120, located within a communicative distance of DVA 110. The communicative distance defines a proximity area in which responses audibly delivered by DVA 110 can be heard, and audible speech by users can be detected and the language and meaning of the speech determined by the AI attributes of DVA 110. In some embodiments, a voice recognition capability of DVA 110, properly trained and with historic sampling included in context corpus 140, enables identification of individual members of additional users 130. In other embodiments, user profiles, social profiles, and telephonic records included on additional users' smart devices 135, and accessible with consenting opt-in permission, enable identification of individual members of additional users 130.

In some embodiments, additional users 130 possess functional knowledge of a common language and individual functional knowledge of at least one additional language. In another embodiment, some members of users 130 possess functional knowledge of only a single language, whereas the other members of additional users 130 possess functional knowledge of two or more languages. In yet other embodiments, additional users 130 include a mix of adult users and younger child users, and in still other embodiments, the first user intends to exclude a command and/or a response to a command delivered to DVA 110 from one or more members of additional users 130. DVA 110 detects languages spoken by additional users 130, represented by detected language 137, via microphones 115.

Additional users' smart devices 135 include the respective mobile devices associated with members of additional users 130. In some embodiments, additional users' smart devices 135 includes smartphones, tablets, and wearable smart devices, such as augmented reality glasses and smartwatches, for example. Additional users' smart devices 135 provide a source of information that, with opt-in approval of the device's owner, facilitate determining languages spoken and understood by respective members of additional users 130. In some embodiments, additional users' smart devices 135, with owning user's opt-in consent, provide information enabling identification of respective members, and can associate the presence of one or more respective users within additional users 130 with a situational context.

Context corpus 140 includes a collection of information associated with DVA 110 and first user 120 and further includes languages used for input commands, the type or nature of the commands, and responses for a plurality of interactions with DVA 110. Context corpus 140 also includes information regarding additional users present at each instance of interaction between DVA 110 and first user 120, such as additional users 130. In some embodiments, context corpus 140 includes identification of activities that include certain individual users or a certain group of users and includes correlations, performed by language selection program 200, between the collected information that establishes the conditions, attributes, users present, languages spoken, and activities associated with the instance of interaction between first user 120 and DVA 110, defining a situation.

In some embodiments, the conditions and attributes of an interaction stored in context corpus 140 include the date, the day of the week, the time of day, the location, the commands delivered, and the language of the commands delivered. In some embodiments, correlations performed by language selection program 200 connects an activity to an instance of interaction between first user 120 and DVA 110 by correlating information included in context corpus 140 associated with repetition of commands, additional users present, date or day of the week, and required or requested language of responses. In some embodiments, context corpus 140 includes correlations, performed by language selection program 200 resulting from supervised learning techniques of machine learning. In some embodiments context corpus 140 collects and associates mobile devices with users and voice recognition of users (i.e., confirmed opt-in consent from respective users), such as first user's smart device 125 and additional users' smart devices 135. In still other embodiments, context corpus 140 associates identified users with the languages the respective users understand.

Figure 2:
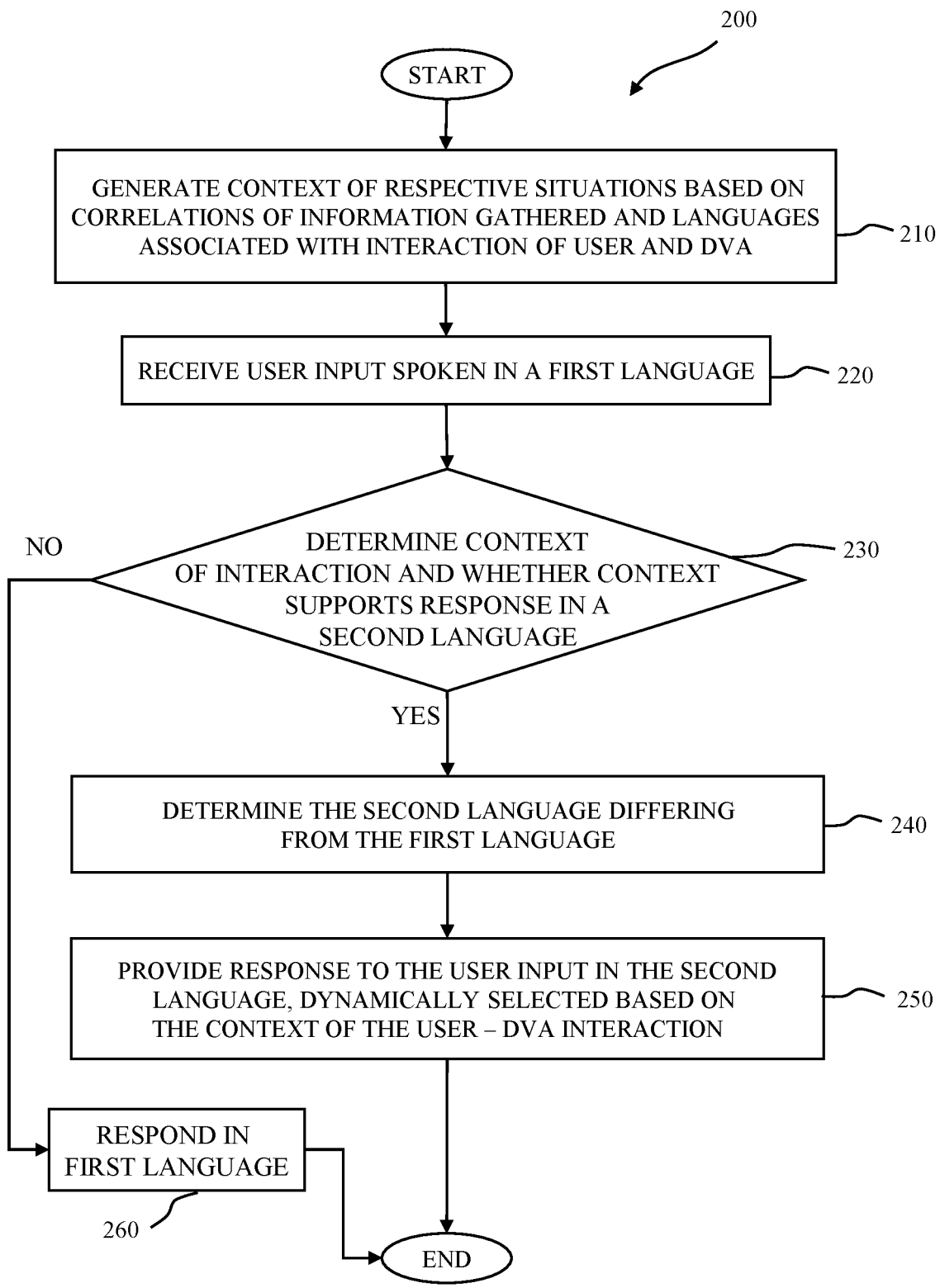
FIG. 2 is a flowchart depicting operational steps of a language selection program, operating in the network of distributed data processing environment of FIG. 1, in accordance with embodiments of the present invention.

FIG. 2 is a flowchart depicting operational steps of language selection program 200 operating in the network of distributed data processing environment 100 of FIG. 1, in accordance with embodiments of the present invention. Language selection program 200 determines whether a command delivered in a first language to a DVA should receive a response in a second language based on the context determined for the interaction of a user delivering a command to the DVA and the respective identities and spoken languages detected of additional users with communicative proximity to the DVA.

Language selection program 200 generates a context of respective historical situations based on correlations of information gathered and languages associated with interactions of a user and a DVA (step 210). Language selection program 200 generates a context of a respective situation in which a situation includes an interaction between a user and a DVA device with the user delivering a command to the DVA device in a first language and the DVA providing a response to the delivered command, determining whether the context of the interaction supports a response in a second language.

In some embodiments of the present invention, language selection program 200 determines the presence of other users speaking in respective languages, and gathers additional information associated with the user—DVA interaction that may include a date, a day of the week, a time of day, a type of command, a topic of the command, and a historic reference of the command. Language selection program 200 performs correlations of the information associated with the particular user—DVA interaction, the language of the command, and the language(s) of additional users present to determine a context of the interaction. Language selection program 200 selects a language in which to respond to the command received by the user, based on the context determined for the interaction. In some embodiments, a corpus of context information includes the gathered information, the correlations, and the context determined for the interaction, such as context corpus 140.

For example, language selection program 200 gathers historic instances of interactions between first user 120 and DVA 110 including information associated with commands delivered verbally to DVA by first user 120 in an identified language, and languages spoken by additional users 130. Additionally, language selection program 200 includes information from first user's smart device 125 and additional users' smart devices 135. Language selection program 200 correlates the gathered information to the language of commands received and language of responses provided, including adjustment commands received to change the response language or include repetition of the response in multiple languages. Language selection program 200 generates a context associated with respective instances of first user 120 verbal interactions with DVA 110 based on the correlations of interaction information to languages of the interaction. Language selection program 200 includes the gathered information, the correlations, and the context associated with a respective interaction between first user 120 and DVA 110 to context corpus 140.

Language selection program 200 receives user input spoken in a first language (step 220). A user initiates an interaction with a DVA by delivering a command to the DVA. Language selection program 200 receives the command from the DVA as input spoken in a first language by the user. In some embodiments language selection program 200 detects if additional users are present within a communicative proximity of the DVA and determines the language(s) spoken by detected additional users. In some embodiments, language selection program 200 identifies members of the additional users based on voice recognition of previously detected and identified voices, or by accessing smart devices of the additional users that include profile information identifying the respective user (and confirming opt-in permission of additional users to allow access to smart device information). Language selection program 200 determines the date, the time of day, the day of the week, the command language, the command type, the command subject matter, the additional user languages spoken, and the additional languages understood by additional users as indicated by smart device access.

Language selection program 200 determines a context of the interaction and whether the context supports a response provided in a second language (decision step 230). Language selection program 200 generates a context for the immediate interaction between the user and the DVA, based on a correlation of the gathered information associated with the interaction, the additional users present, the language of the command delivered, and languages associated with the additional users. For the case in which language selection program 200 determines that the context of the interaction between the user and the DVA does not support providing a response in a second language (step 230, "NO" branch), language selection program 200 provides a response in the first language (step 270), matching the language of the delivered command.

For the case in which language selection program 200 determines the context of the interaction with the user supports providing a response to the delivered command in a second language (step 230, "YES" branch), language selection program 200 determines the second language for the response, differing from the first language (step 240), based on the context of the interaction between the user providing the input command and the DVA, and other users within communicative proximity of the DVA. In some embodiments, language selection program 200 determines the context of the interaction of a command delivered by a user to the DVA in a first language supports a response in a "common tongue" second language of the user and additional users present in the communicative area of the DVA. The selection of the second language by language selection program 200 is based on a context that not all of the additional users present fully understand the first language, but all additional users and the user delivering the command are fluent in the second language.

In another embodiment, language selection program 200 determines the context of the interaction to exclude one or more additional users that are present from information in the response to the delivered command. Language selection program 200 supports a response in a second language that excludes the information in the response from the one or more additional users. In yet another embodiment, language selection program 200 determines the context of the interaction to support repeating the input command in a second language due to additional users in the communicative area of the DVA that do not understand the first language used by the user to deliver the command. In the embodiment, language selection program 200 receives the command from the user in the first language, repeats the command in the second language, and provides the response sequentially in the first language and the second language.

In yet another embodiment, language selection program 200 determines the identity of additional users in the communicative proximity of the DVA, based on voice recognition and/or information accessed from smart devices of the additional user in proximity of the DVA and opt-in permission granted by the additional users. Language selection program 200 determines that some of the additional users are identified with a ranking, which is included in determining the context of the situation and influences the selection of a second language in which the response to the delivered command is provided. In some embodiments, information considered in establishing a ranking comes from profile information and online accessible relationship data from users' smart devices and users' permission for access. For example, some members of the additional users in a communicative proximity of DVA 110 are determined to be ranked with a clearance for certain information, whereas others of the additional users in proximity of DVA 110 are not ranked with a clearance for the information. DVA 110 selects a second language in which the ranked users understand the response and the un-ranked users do not understand the response delivered in the second language.

Language selection program 200 provides the response to the user input in the second language, dynamically selected based on the context of the interaction between the user and the DVA (step 250). Language selection program 200 responds to the user input command in the second language, dynamically selecting the second language based on the context of the user—DVA interaction, determined from the gathered information associated with the interaction and historic context references in a context corpus accessible to language selection program 200.

Having provided the response in a second language to the user's command delivered in the first language, language selection program 200 ends.

FIG. 3 depicts a block diagram of components of system 300, which includes computing device 305. Computing device 305 includes components and functional capability similar to portions of digital virtual assistant 110 (FIG. 1), in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 305 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications, and network processors, etc.), system memory, peripheral devices, and any other hardware components within a system. For example, communications fabric 302 can be implemented with one or more buses.

Memory 306, cache memory 316, and persistent storage 308 are computer readable storage media. In this embodiment, memory 306 includes random access memory (RAM) 314. In general, memory 306 can include any suitable volatile or non-volatile computer readable storage media.

Language selection program 200 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of distributed data processing environment 100, such as first user's smart device 125, additional users' smart devices 135, and context corpus 140. In these examples, communications unit 310 includes one or more network interface cards. Communications unit 310 may provide communications through the use of either or both physical and wireless communications links. Language selection program 200 may be downloaded to persistent storage 308 through communications unit 310.

I/O interface(s) 312 allows for input and output of data with other devices that may be connected to computing system 300. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention, e.g., language selection program 200, can be stored on such portable computer readable storage media and can be loaded onto persistent storage 308 via I/O interface(s) 312. I/O interface(s) 312 also connects to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for dynamic language selection by a digital virtual assistant, the method comprising:
receiving, by the digital virtual assistant, input spoken in a first language by a first user;
gathering, by the digital virtual assistant over a network, information from devices of individuals within a proximity of the digital virtual assistant;
determining, by the virtual digital assistant, respective identities of, and languages being spoken by the individuals according to the information;
determining, by the digital virtual assistant, a context of a current situation based on correlations of the current situation with historic interactions of the user and the digital virtual assistant, the respective identities of, and the languages being spoken by the individuals within the proximity of the digital virtual assistant;
determining, by the digital virtual assistant, whether the context of the current situation includes providing a response to the input using a second language;
in response to determining the context of the current situation calls for the response to the input using the second language, determining, by the digital virtual assistant, the second language based on the context; and
responding, by the digital virtual assistant, to the input spoken in the first language by the first user, wherein the response includes a dynamic selection of the second language and is based, at least in part, on a contextual usage of the at least second language in a historically similar situation.

2. The method of claim 1, further comprising:
determining, by the digital virtual assistant, the context of the current situation, based on a corpus of situations in which a plurality of users are within communication distance of the digital virtual assistant and languages spoken by the plurality of users are identified; and
determining, by the digital virtual assistant, a common language spoken by the plurality of users, based on one or a combination from a group consisting of detected languages spoken, voice recognition, and identification associated with a mobile device of respective users of the plurality of users within communication distance of the digital virtual assistant.

3. The method of claim 1, further comprises:
determining, by the digital virtual assistant, a commonly spoken language among a plurality of identified individuals within the proximity of the digital virtual assistant based on a portion of the plurality of the identified individuals using the commonly spoken language exceeding a predetermined threshold.

4. The method of claim 1, wherein the input which is spoken in the first language by the first user is repeated in the second language prior to providing the response to the input.

5. The method of claim 1, wherein the response to the input, which is spoken in the first language, is delivered in a second language that differs from a common language spoken by the individuals within the proximity of the digital virtual assistant.

6. The method of claim 1, wherein a prioritization of the dynamic selection of the second language is based on a ranking of the individuals within the proximity of the digital virtual assistant.

7. The method of claim 1, wherein the first user specifies the second language.

8. A computer program product for dynamic language selection by a digital virtual assistant, the computer program product comprising:
one or more computer-readable storage media, and program instructions stored on the one or more computer-readable storage media, the program instructions comprising:
program instructions to receive input spoken in a first language by a first user;
program instructions to gather information over a network from devices of individuals within a proximity of the digital virtual assistant;
program instructions to determine respective identities of, and languages being spoken by the individuals according to the information;
program instructions to determine a context of a current situation based on correlations of the current situation with historic interactions of the user and the digital virtual assistant, the respective identities of, and the languages being spoken by the individuals within the proximity of the digital virtual assistant;

program instructions to determine whether the context of the current situation includes providing a response to the input using a second language;

in response to determining the context of the current situation calls for the response to the input using the second language, program instructions to determine the second language based on the context; and program instructions to respond to the input spoken in the first language by the first user, wherein the response includes a dynamic selection of the second language and is based, at least in part, on a contextual usage of the at least second language in a historically similar situation.

9. The computer program product of claim 8, further comprising:

program instructions to determine the context of the current situation, based on a corpus of situations in which a plurality of users is within communication distance of the digital virtual assistant and languages spoken by the plurality of users are identified; and program instructions to determine a common language spoken by the plurality of users, based on one or a combination from a group consisting of detected languages spoken, voice recognition, and identification associated with a mobile device of respective users of the plurality of users within communication distance of the digital virtual assistant.

10. The computer program product of claim 8, further comprising:

program instructions to determine commonly spoken language among a plurality of identified individuals within the proximity of the digital virtual assistant based on a portion of the plurality of the identified individuals using the commonly spoken language exceeding a predetermined threshold.

11. The computer program product of claim 8, wherein program instructions to respond to the input, which is spoken in the first language by the first user, include program instructions to repeat the input in the second language prior to providing the response to the input.

12. The computer program product of claim 8, wherein program instructions designate the response to the input that is spoken in the first language to be provided in a second language that differs from a common language spoken by the individuals within the proximity of the digital virtual assistant.

13. The computer program product of claim 8, wherein a prioritization of the dynamic selection of the second language is based on a ranking of the individuals within the proximity of the digital virtual assistant.

14. The computer program product of claim 8, wherein the first user specifies the second language.

15. A computer system for dynamic language selection by a digital virtual assistant, the computer system comprising:

one or more computer processors;

one or more computer-readable storage media, and program instructions stored on the one or more computer-readable storage media for execution by the one or more computer processors, the program instructions comprising:

program instructions to receive input spoken in a first language by a first user;

program instructions to gather information over a network from devices of individuals within a proximity of the digital virtual assistant;

program instructions to determine respective identities of, and languages being spoken by the individuals according to the information;

program instructions to determine a context of a current situation based on correlations of the current situation with historic interactions of the user and the digital virtual assistant, the respective identities of, and the languages being spoken by the individuals within the proximity of the digital virtual assistant;

program instructions to determine whether the context of the current situation includes providing a response to the input using a second language;

in response to determining the context of the current situation calls for the response to the input using the second language, program instructions to determine the second language based on the context; and program instructions to respond to the input spoken in the first language by the first user, wherein the response includes a dynamic selection of the second language and is based, at least in part, on a contextual usage of the at least second language in a historically similar situation.

16. The computer system of claim 15, further comprising:

determining, by the digital virtual assistant, the context of the current situation, based on a corpus of situations in which a plurality of users are within communication distance of the digital virtual assistant and languages spoken by the plurality of users are identified; and determining, by the digital virtual assistant, a common language spoken by the plurality of users, based on one or a combination from a group consisting of detected languages spoken, voice recognition, and identification associated with a mobile device of respective users of the plurality of users within communication distance of the digital virtual assistant.

17. The computer system of claim 15, further comprising:

program instructions to determine commonly spoken language among a plurality of identified individuals within the proximity of the digital virtual assistant based on a portion of the plurality of the identified individuals using the commonly spoken language exceeding a predetermined threshold.

18. The computer system of claim 15, wherein program instructions to respond to the input, which is spoken in the first language by the first user, include program instructions to repeat the input in the second language prior to providing the response to the input.

19. The computer system of claim 15, wherein program instructions to designate the response to the input that is spoken in the first language to be provided in a second language that differs from a common language spoken by the individuals within the proximity of the digital virtual assistant.

20. The computer system of claim 15, wherein a prioritization of the dynamic selection of the second language is based on a ranking of the individuals within the proximity of the digital virtual assistant.

* * * * *